(12) United States Patent
Farrell et al.

(10) Patent No.: US 10,007,887 B2
(45) Date of Patent: Jun. 26, 2018

(54) FAILURE IMPACT MANAGER

(71) Applicant: International Business Machines Corporation, Armonk, NY (US)

(72) Inventors: Robert G. Farrell, Cornwall, NY (US); Dimitri Kanevsky, Ossining, NY (US); Peter K. Malkin, Yorktown Heights, NY (US); Tara N. Sainath, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 607 days.

(21) Appl. No.: 14/286,150

(22) Filed: May 23, 2014

(65) Prior Publication Data
US 2015/0339618 A1  Nov. 26, 2015

(51) Int. Cl.
*G06Q 10/06* (2012.01)

(52) U.S. Cl.
CPC ..... *G06Q 10/063116* (2013.01); *G06Q 10/06* (2013.01)

(58) Field of Classification Search
CPC .............. G06Q 10/00; G06Q 40/00; G06Q 10/063116; G06Q 10/06; G06F 17/60
USPC ........................................ 705/7.19
See application file for complete search history.

(56) References Cited

U.S. PATENT DOCUMENTS

| | | | |
|---|---|---|---|
| 7,444,200 B1 * | 10/2008 | Qu .................. | G06Q 10/06 700/121 |
| 7,676,445 B2 | 3/2010 | Fry et al. | |
| 8,155,908 B2 | 4/2012 | Nasle et al. | |
| 2008/0086320 A1 * | 4/2008 | Ballew ............. | G06Q 10/06 705/342 |
| 2011/0066898 A1 * | 3/2011 | McRory ........... | G06F 11/008 714/47.3 |
| 2011/0137697 A1 * | 6/2011 | Yedatore ........ | G05B 23/0283 705/7.13 |
| 2012/0030525 A1 | 2/2012 | Horstemeyer | |
| 2014/0343988 A1 * | 11/2014 | Ashtiani .......... | G06Q 10/06311 705/7.17 |

FOREIGN PATENT DOCUMENTS

| | | |
|---|---|---|
| EP | 2426858A1 A1 | 3/2012 |
| JP | 2012213057A A1 | 11/2012 |
| WO | WO2009070072A1 A1 | 6/2009 |

OTHER PUBLICATIONS

Mark et al (VoIP Network Failure Detection and User Notification), Dec. 2003, IEEE, pp. 511-516.*

(Continued)

*Primary Examiner* — Romain Jeanty
(74) *Attorney, Agent, or Firm* — Scully, Scott, Murphy & Presser, P.C.; Yeen C. Tham, Esq.

(57) ABSTRACT

A possible failure of a first device may be identified. Whether a user of the first device has a scheduled meeting to be held within a time range of the possible failure, may be determined by accessing calendar information. Responsive to determining that the user has the scheduled meeting to be held within the time range of the possible failure, at least one other participant of the scheduled meeting may be determined by accessing the calendar information, a contact address for said at least one other participant may be determined, and information may be transferred to the at least one other participant via the contact address.

19 Claims, 3 Drawing Sheets

(56) References Cited

OTHER PUBLICATIONS

IBM, Predictive Failure Analysis, Feb. 2010, pp. 1-1, http://www-05.ibm.com/hu/termekismertetok/xseries/dn/pfa.pdf.
Salfner et al., A Survey of Online Failure Prediction Methods, ACM Computing Surveys (CSUR), Mar. 2010, vol. 42, Issue 3, Article No. 10, pp. 1-68, http://informatik.hu-berlin.de/Members/salfner/publications/salfner10survey.pdf.
Karol et al., VoIP Network Failure Detection and User Notification, Computer Communications and Networks, 2003. ICCCN 2003. Proceedings. 12th International Conference, Oct. 20-22, 2003, pp. 511-516.

\* cited by examiner

FAILURE IMPACT MANAGER

FIELD

The present application relates generally to computers, and computer applications, and more particularly to a collaboration application and system.

BACKGROUND

There are situations when personal computer systems (e.g., laptops, tablets, and others) are approaching a failure state in which they will not be able to perform some functions required by their owners. Such failing state of a computer system may prevent an owner of the computer system from performing the required functions in a timely manner. Furthermore, people who may be depending upon the owner ("effected parties") may be often unaware that the owner is having a computer system problem, since the personal computer system that is the mechanism of communication between the owner and the effected parties would not be functioning properly and hence preventing such communication.

For example, consider the following situation. A user is bringing his/her laptop from his/her room for a meeting in another room where he/she will be connected to the internet to use internet services during the meeting (e.g., transcription, translation, or search). Assume that on the way to the other room the laptop's connection to the internet is about to fail. The user may need to decide whether to continue to go to the meeting room and may spend 10 minutes recovering an internet connection or go back to his/her room and get (or borrow) another laptop or tablet (that would delay the onset of the meeting for several minutes). If the user decides to return back to his/her room then he/she would like to inform other meeting attendees about the delay.

Consider another example. A user arrived to a meeting room and cannot start her/his laptop due to a system failure. The user needs to inform others about the room number or conference call number change but he/she cannot do this until he/she can start the laptop and get an internet connection (e.g., reroute the laptop to a different router). This laptop failure may lead to significant meeting delays since other users may head to a wrong location or call wrong conference numbers.

BRIEF SUMMARY

A method of managing failure impact of a computing device, in one aspect, may comprise identifying, automatically by a processor, a possible failure of a first device. The method may also comprise determining whether a user of the first device has a scheduled meeting to be held within a time range of the possible failure, by accessing calendar information. The method may further comprise determining at least one other participant of the scheduled meeting by accessing the calendar information, responsive to determining that the user has the scheduled meeting to be held within the time range of the possible failure. The method may also comprise determining a contact address for said at least one other participant, responsive to determining that the user has the scheduled meeting to be held within the time range of the possible failure. The method may further comprise transferring information to the at least one other participant via the contact address, responsive to determining that the user has the scheduled meeting to be held within the time range of the possible failure.

A system for managing failure impact of a computing device, in one aspect, may comprise a first device comprising at least one processor. The system may also comprise an impact failure manager module operable to execute on the processor and further operable to identify a possible failure of the first device. The impact failure manager may be further operable to determine whether a user of the first device has a scheduled meeting to be held within a time range of the possible failure, by accessing calendar information. The impact failure manager may be further operable to determine at least one other participant of the scheduled meeting by accessing the calendar information, responsive to determining that the user has the scheduled meeting to be held within the time range of the possible failure. The impact failure manager may be further operable to determine a contact address for said at least one other participant, responsive to determining that the user has the scheduled meeting to be held within the time range of the possible failure. The impact failure manager may be further operable to transfer information to the at least one other participant via the contact address, responsive to determining that the user has the scheduled meeting to be held within the time range of the possible failure.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Known methodologies in the field of computer science may analyze failures and also predict possible failures. However, those methodologies do not address the need for actions beyond the system where the failure process is ongoing, in order to minimize a harmful impact of the possible failure. Personal devices like laptops, tablets, and mobile smartphones are typically missing this kind of failure management and there is no ability to determine the impact on upcoming events and to engage the people or other entity involved in those events subsequent to the failure.

Thus, there is a need to efficiently address personal networked computing device failures before they happen or at their onset by identifying the possible harmful impact of such failures on external events and preventing or minimizing this harmful impact. The impact of failure may include the owner being unable to attend the meeting, being late to the meeting, being unable to perform an operation requiring the failed computer device such as looking up information or sending documents or e-mails, to people while at the meeting, or other aspects of the meeting.

In the present disclosure in one embodiment, one or more methods and systems may be provided that alert meeting participants about the failure of one of the user's computing devices. For example, if a user's computing device fails, there may be no way of contacting the members of a meeting that the user is supposed to attend. A methodology of the present disclosure in one embodiment may predict failure in a computer system, and determine if a meeting is scheduled for the user of the computer system. If so, the methodology may include sending contact information (e.g., e-mail address) to a second device (e.g., a phone, or other device of the user, e.g., the user is carrying) so that the second device can alert the other participants that the user's computing device has failed. As such, the meeting participants may be notified as to why the user is not available on instant chat or another similar communications service.

In one embodiment, a methodology of the present disclosure may be implemented as a software service that can be run on a personal networked computing device such as a laptop or tablet, or another personal computing device.

Figure 1:
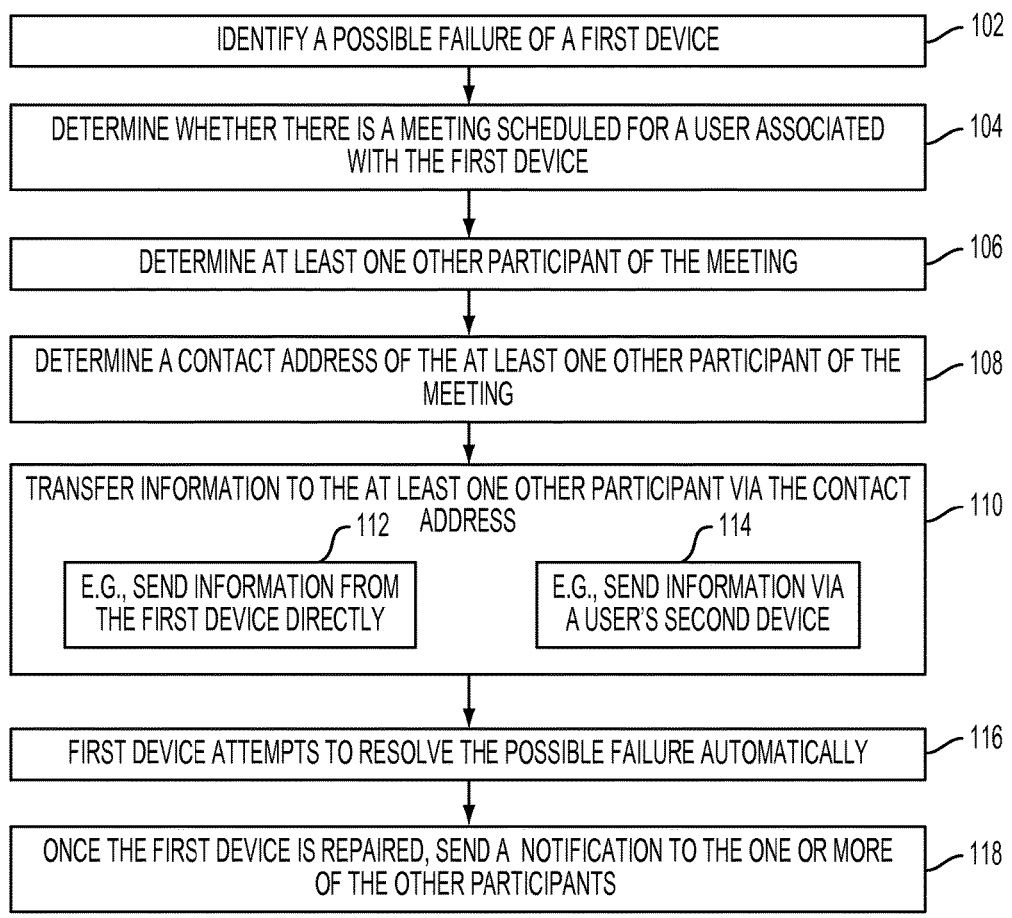
FIG. 1 is a diagram illustrating a logic flow in a method managing impact of a computing device in one embodiment of the present disclosure.

FIG. 1 is a diagram illustrating a logic flow in a method managing impact of a computing device in one embodiment of the present disclosure. At 102, a possible failure of a device (also referred to as a first device) may be detected or identified. An example of such a device is a computing device such as a personal computer, a laptop, a tablet, or another computing device, which for instance, a user is using or otherwise associated with the user. For example, the user may be carrying the device but not using it at the moment. However, the device is on. Alternatively, it may be not being carried by the user but it may be the user's personal device the user owns and will be the computer used at the meeting. The device to be used at a meeting is not typically known in the calendar invitation, though this is possible. However, if the user owns the device then it is a fair inference that the user will want to use it at the meeting, even if the user is not using it to present information. A processing unit or processor of the device may identify, for example, imminent or impending failure, e.g., by detecting one or more of a computer virus infecting the device, an unauthorized intrusion on the device, a network connection failure, a battery depletion, an electrical or mechanical failure, or another system failure, or combinations thereof. One or more technique used by virus or malware detection software, system monitoring software, network managing or monitoring software, and/or the like may be employed by the processor in detecting or identifying the possible failure. For example, such software running on the processor may provide information as to the possible failure.

Computer systems generally have mechanisms for catching interruption to normal operation and performing an alternate action. This is called an interrupt. An interrupt is a signal to the processor emitted by hardware or software indicating an event that needs immediate attention such as may happen prior to a complete failure. An interrupt alerts the processor to a high-priority condition requiring the interruption of the current code the processor is executing in a thread. The processor responds by suspending its current steps, saving its state, and executing a small program "interrupt handler" to deal with the event. This interruption is temporary, and after the interrupt handler finishes, the processor resumes execution of the previous thread. However, an interrupt handler may start the operations of the present disclosure such as alerting meeting participants and thus the operations of the present disclosure may happen prior to complete failure.

Part of an interrupt handler may be to start a recovery of the failure. The mechanisms of the present disclosure may be executed before the recovery actions, after the recovery, actions or in parallel with the recovery.

One mechanism for running mechanisms of the present disclosure is to have a hidden secondary processor and/or hard disk storage that runs a minimal operating system. If there is a failure in the primary system, the primary system immediately branches the code to execute the handler on the secondary system that may start the operations of the present disclosure.

Virus protection programs may have software for automated incident handling that can run following a virus being identified or contained/quarantined. Once a virus is identified, the virus protection program may alert the user to a virus, for example. At the time of alerting the user, the mechanisms of the present disclosure may be invoked to perform operations such as alerting meeting participants. Additionally, some viruses can be quarantined so that they cannot infect the rest of the computer system. Automated incident handling code may be run to protect other systems, such as disconnecting the computer from the network. Mechanisms of the present disclosure may need to be executed prior to the disconnection.

Computer systems have many types of self-test programs e.g., CHKDSK for checking a hard drive for failures. Following the detection, there is often a correction phase, such as fixing bad sectors of the hard disk. Before running this correction phase, mechanisms of the present disclosure can be executed.

An alternate way of identifying a possible failure is to have a low priority process or thread that periodically wakes up and runs the virus, disk, network, or other check program, determines if there is a possible failure from the output of that program, and if there is a possible failure performs the actions of the present disclosure.

The virus, hard disk failure, battery depletion, etc., may continue to happen despite the actions of the present disclosure. In this case, it is possible that the total failure may result in the mechanisms of the present disclosure not being performed or being performed improperly. The mechanisms of suspending normal operation, saving or quarantining program code and files, or performing the mechanisms of the present disclosure on another processor or externally to the device itself may mitigate this problem.

At 104, it is determined whether there is a meeting scheduled for a user associated with the device. The user may be identified, e.g., by checking the user account information of the device. Such information may be stored on the device. Then, calendar data or information associated with the user may be accessed and checked to determine whether that user has a meeting scheduled to be held, for instance, within a defined time range of the possible failure. Calendar data or information may be obtained from calendar software or like that saves schedules or appointments. Such information may be stored on the device or on another device. If the calendar data or information is stored on another device, the information is retrieved remotely via a communication network. As an example, the calendar information may be checked for all scheduled meetings that are scheduled to be held within a specified time, e.g., within that day, within an hour of the possible failure, etc. The defined time range may be configurable.

In response to determining that the user of the device has a scheduled meeting to be held within the time range of the possible failure, at least one other participant of the scheduled meeting is determined at 106, e.g., by accessing and checking the calendar information. For example, the calendar information may include a list of participants. Calendaring systems generally include a file or database of calendar entries. Each calendar entry typically includes a list of required and optional participants using addresses, e.g., e-mail addresses. Additionally, the calendar entry may include a description, notes, etc., that provide text that can be processed to determine meeting participants by name and the names can be looked up in a directory or web site to determine an address.

At 108, a contact address for one or more of the other participant may be determined, e.g., in response to determining that the user of the device has a scheduled meeting to be held within the time range of the possible failure. The e-mail address in the calendar entry from step 106 may be used directly. However, it may be the case that the meeting participants need to be notified by other means because they are not reachable at the e-mail address in the calendar entry. In this case, other contact addresses may be used. A directory or web site can be used to look up the participant and other contact addresses and communication means may be determined in this fashion. For example, the participant's phone number might be listed in the directory along with their e-mail address and the phone number can be used as a contact address.

Optionally, a location may be specified. The location can be used to determine if it is a physical meeting at a meeting room or a call-in meeting, or address or links to web sites used for external meetings.

At 110, information is transferred to at least one other participant via the contact address. For example, information associated with the possible failure of the user's first device may be sent to at least one other participant via the contact address, for instance, to notify at least one other participant that the user's first device is failing. The notification may take many forms. For example, it may be embarrassing that the user's device is failing and thus the notifications can be configured to just indicate that the person is delayed or is having some type of technical problem. In one aspect, the information may be sent directly from the first device at 112. In another aspect, the information may be sent indirectly via a second device at 114, if for example, a connection from the first device to another participant cannot be established, and if for example, it is possible to establish a connection to the other participant via the second device. This may happen, if for example, the second device is equipped to receive data via an alternative communication method that is different from the communication method that is not working for communicating with the other participant. For instance, a wireless communication such as WiFi used to communicate between the first device and another participant's device may be not working, but a short range communication or cellular network may be available and working between the first device and the user's second device. For example, it is common for a user's laptop and their mobile phone to be equipped with Bluetooth connectivity. The first device may transmit to the second device, the contact address of the at least one other participant and information about the failure of the first device. This information can include the time of the transfer, the predicted time of failure, or information needed for the other participant to help the owner of the device fix the problem leading to the failure of the first device. The second device may then send information to at least one other participant (e.g., via the contact address), so the at least one other participant would be made aware that the user might not be able to participate in the scheduled meeting. The notice may make it possible for each participant to know that the other participants also received the notice about the failure, so that the other participants do not take time to contact one another.

As another example, additional data stored on the first device and associated with the scheduled meeting to be held, may be transmitted to at least one other participant via the contact address. The data, for example, may include prepared meeting material or other information useful to the meeting participants that can be consumed prior to the meeting. Another example of the data that is transmitted may include information as to how other one or more participants may contact the user, for example, via another Internet Protocol (IP) address to use or another device address.

The user of the device may be also notified or informed of the possible failure, and for example, of the scheduled meeting. The first device, for example, may present or display such notification. The first device may also automatically attempt to contact the user via user's second device or another device. Examples of user's second device or another device may include a smartphone, laptop, cellular phone, another portable computer, etc. This way, the user may be informed ahead of time of the scheduled meeting, that because of the user's device failure, the user might not be able to participate in the scheduled meeting as planned.

At 116, the first device may attempt to resolve the possible failure automatically, for example, by performing a self-diagnosis and resolution. The first device may notify the user that the first device has been repaired. In another aspect, the possible failure may be resolved by another entity, for example, a user or an administrator manually providing a fix to the possible failure.

At 118, once the first device is repaired, a notification may be sent to the one or more of the other participants (e.g., to the at least one other participant that received the notification about the failure) from the first device automatically, for example, by transmitting a message to the contact address of the at least one participant that the user's first device is repaired. In another aspect, such message may be transmitted from the user's second device, upon the second device becoming aware that the first device has been fixed (e.g., by an automatic message from the first device).

Figure 2:
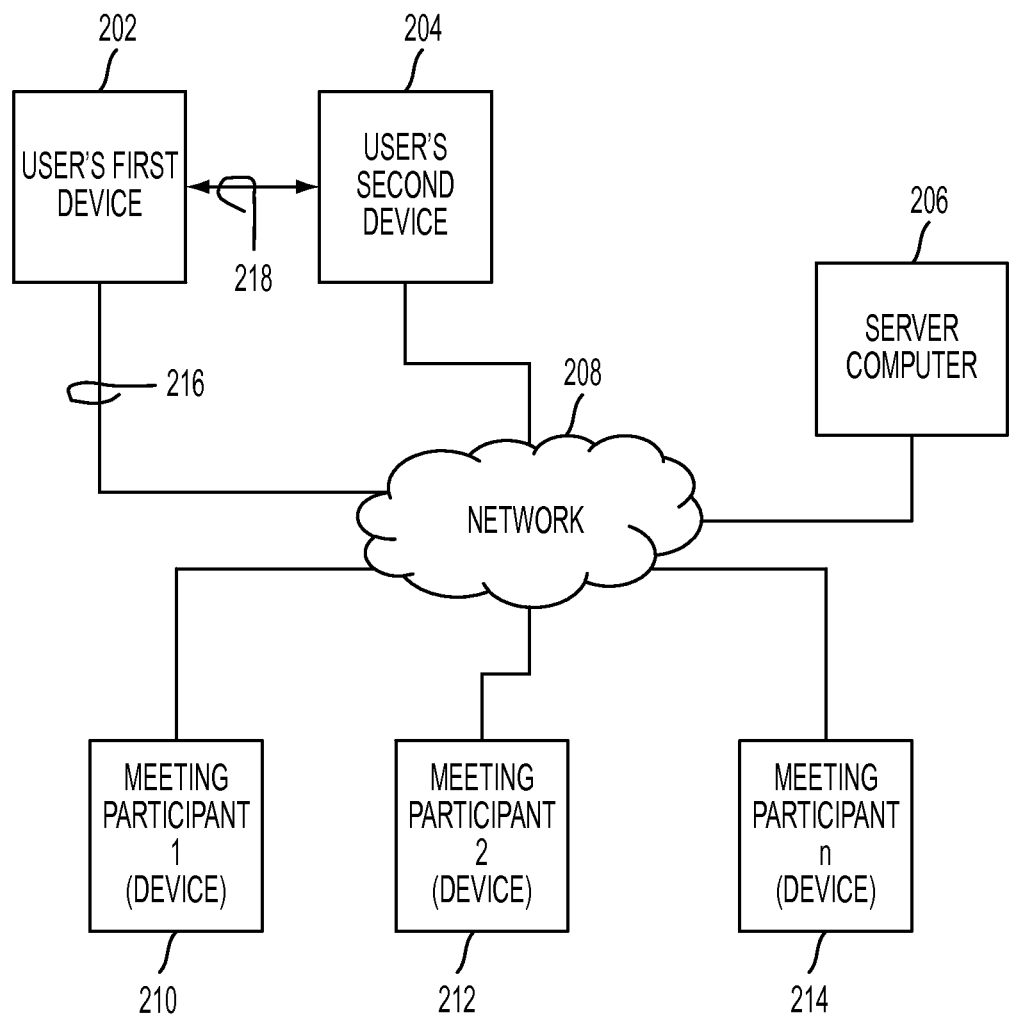
FIG. 2 is a diagram illustrating system components for managing impact of a failure in computing device in one embodiment of the present disclosure.

FIG. 2 is a diagram illustrating system components for managing impact of a failure in computing device in one embodiment of the present disclosure. In one embodiment of the present disclosure, a list of parties who may be affected by a failure of a computing device (e.g., 202) may be maintained, for example, on a server computer 206, or for example, on the computing device itself 202. The computing device 202 is monitored continuously to identify or predict a possible onset of a failure. The computing device 202 autonomously may perform the monitoring of its status. For example, monitoring software running on the computing device 202 or an operating system running on the computing device 202 may perform the monitoring. The computing device then communicates the potential failure to the parties who would be affected (e.g., via one or more of the devices shown at 210, 212, 214). The computing device 202 may also send information about the failure status to another device 204, e.g., of the same user of the computing device 202. The computing device 202 may notify the user of the computing device 202. The computing device 202 may attempt to automatically correct it, e.g., using known methods. If automatic correction fails, a list of actions to take may be provided. For example, it may display a menu with options such as backup, restore to a previous setting, disconnect and reconnect, run diagnostics, etc. Once the possible error is corrected, the other parties (e.g., at 210) may be notified of the repaired status of the computing device 202.

The failure may occur due to a computer virus or intrusion, system failure, a type of critical even, or any other failure that could spread to others or interrupt collaboration. Such failure of one computing device may be of interest, e.g., if the users will be in a meeting together, working together, in collaboration, and the computing device is planned to be used to conduct the meeting.

In one aspect, data or information associated with the computing device 202 may be communicated via a network 208, e.g., to others. In another aspect, data or information associated with the computing device 202 may be communicated to a user's second device 204 via another communication mode.

The following describes an example use scenario with reference to the components shown in FIG. 2. User X walks with his/her laptop (e.g., 202) from one room to another for a meeting with users Y (e.g., 210) and Z (e.g., 212), but during this walk the connection between the laptop (e.g., 202) and the network system (e.g., 208) in the building is about to collapse.

Detecting the possible or potential network failure, a disaster assisting manager (e.g., software or application) running on the user's laptop (e.g., 202) accesses the calendar of the user and locally caches all of the upcoming meeting information. In one aspect, the calendar information may be accessed remotely, e.g., from a server computer (e.g., 206) that stores the calendar information. In another aspect, the calendar information may already be stored in the user's laptop (e.g., 202), in which case, the access would be local.

The disaster assisting manager predicts imminent failure of the network connection or detects the onset of the failure of the connection. The disaster assisting manager (e.g., running on the user's laptop 202) immediately sends a note to participants of the meeting (Y 210 and Z 212) that the user X's device (e.g., 202) may lose their connection in a few seconds. Thus, if all subsequent methods to fix the problem fail, such as rebooting or other debugging actions, the other participants of the meeting are not surprised if the user shows up late (e.g., because they went back to their office to get another device) or without their laptop (e.g., because the user had to drop off the laptop at a service center).

If the disaster management (e.g., running on the user's laptop 202) finds out that it is not able to send a note directly to participants using the local area or wide area network connection (e.g., 208), then attempts to send a note to other (e.g., nearby) devices (e.g., 204) owned or used by the user (like their mobile phone) via an alternate communication method (e.g., short range wireless communication such as Bluetooth™, cellular communication such as 3G, or another, e.g., shown at 218). A disaster assisting manager running on the other devices (e.g. 204) may then communicate the note to the participants of the meeting. For example, as described above, contact address of one or more of the participants of the meeting may be transmitted from the user's laptop (e.g., 202) to another of user's device (e.g., 204). Then a message may be sent from the user's other device (e.g., 204) to the one or more contact addresses, wherein the other participants may receive the message, e.g., via their devices (e.g., 210, 212).

In one embodiment, a list of ways to contact the other participants, ranked from most to least preferable, is kept in a user directory or website. For example, the preferred contact method may be by phone and the secondary contact method by e-mail. The other participants may be contacted by the disaster manager by way of this list until communication is made and the notice of failure is delivered. Unified messaging systems, known in the art, that can contact a user through multiple communications channels or handle the user's preferences for being contacted may be employed.

The disaster manager (e.g., running on the user's laptop 202) also analyses what actions should be done after the network connection (e.g., 216) is broken. The disaster manager may attempt to automatically correct (auto-correct) the failure (e.g., by reconfiguring or rerouting automatically). It may display a message to the user on the user's laptop (e.g., 202) or send a message to a user's other personal devices (like mobile phone), e.g., 204, indicating what has been fixed.

If the auto-correct does not work, then the disaster manger may display a menu with options like backup, restore to a previous setting, disconnect and reconnect, run a diagnostic, etc. The disaster manger may also display information on the chances that each option is likely to succeed and how much time the process may take. The chances of succeeding may be based upon prestored default values for the given type of problem (e.g., disconnecting and reconnecting might work 20% of the time and rebooting work 60% of the time). The time that the process may take may be based initially upon default values (e.g., a backup takes an hour per 100 gigabyte (GB)) but can be updated upon use of these options on the given machine (e.g., restoring settings last took 5 minutes).

In one aspect, the prediction of the failure may not be 100% accurate that the connection will be lost. In this case, if for example, there is a threshold of certainty, for instance, X % certainty, then the disaster manager may set up a process on another device (e.g., 204) that pings back or polls (send periodic communication and receive acknowledgment) to the laptop 202 to see if it is still alive.

The disaster manager may have a predefined list specifying the methods of communication in order of the most to least reliable: for example, maybe the user does not get reception in his office where his primary laptop is located, so the next best method may be to send messages to his tablet or another laptop located elsewhere or cell phone. The disaster manager may, if needed, send communications to other people's personal devices so that the user can get information from those devices. The disaster manager may also have access to the user's plans (e.g., via reading a user's calendar) and can use this information to notify the user appropriately. For example, if the user is in a meeting they may want to receive a text message instead of a phone call.

In another aspect, the disaster manager may wait until just before the meeting for a configurable amount of time (e.g., 5 minutes) to send notifications. In this way, if the problem is fixed, the disaster manager need not send the notification of the failure, but participants will still be notified if there is still a problem up to the specified time before the meeting.

The following describes example data structures that may be created and accessed for implementing the methodology of the present disclosure in one embodiment.

A General Preferences data table includes preferences such as the amount of time to wait before notifying participants. In one embodiment of the present disclosure, these preferences are not specific to each user, but rather apply across all users. This data may be accessed, e.g., before performing the processing at 110 in FIG. 1, to determine when to sent a notification.

A Devices data table includes an identifier (ID) for the device, the user ID of the owner, and a status. The status may include a flag for failure, e.g., failed, or fixed, and flagged time, failed time, and fixed time. This data includes all of the devices of each user. This data may be updated as device failures are detected, e.g., at 102 in FIG. 1. The data may also be updated as the device is repaired, e.g., at 116 in FIG. 1.

A Failure data table includes an identifier for the possible failure, the calendar entry, the notification of failure, options tried, data, and status. The notice is generated so that it can be sent out later. The options tried may include backup, restore settings, disconnect and reconnect, run diagnostics, etc. The data field includes the data about the specific failure needed for a person to work on it (that could be communicated to someone else). The data may be updated after attempting one or more auto-correct procedures at 116 in FIG. 1, and e.g., when a notification is to be sent.

The Preferences data table holds the information about how users want to be identified about device failures. This table stores a user ID, and one or more preference methods, e.g., a first preference method (e.g., primary e-mail address), a second preference method, a third preference method, may hold additional preference methods. The methods can include e-mail, text message, phone, instant message, and other communication methods. The actual contact address, e.g., e-mail address, phone numbers, etc., are stored in the contacts information. This data may be accessed to inform the user of device failures of their own devices or device failure of others.

The User data table includes the backup method and address. The backup method identifies a type of device to look for to discover for communicating the contact information and sending the notifications. The address is the actual address needed to contact the backup device. This is stored for each user. For instance, this data table holds information about finding the user's second device (e.g., FIG. 2, 204) and the second device's address.

The Calendar data table accessed includes information about the calendar entry, including, e.g., the sender, recipients, note, time, and location. This data may be accessed at 104 in FIG. 1, to determine the user's schedule.

A Contacts data table accessed includes the user ID, name, and list of contact addresses. Note that this is typically available on the mobile phone's contact list or user directory, etc. This data may be accessed, e.g., at 108 in FIG. 1 to determine a contact address of at least one other participant.

The Notifications data table includes the type of failure, the priority of this type of failure, and the notification template to use. The notification template is a string in a natural language that has variables that can be substituted. The variables include the sender, recipients, type of failure, calendar information, etc., to personalize the notification to the recipient and situation and method of contact (emails can be longer than instant messages or text messages). This data may be accessed, e.g., at 110 shown in FIG. 1 for transferring information to the at least one other participant.

The Options data table includes the type of repair or other action, the chance of succeeding (percentage), estimated time, the estimated cost, the estimated benefit. The type of repair may be, reboot, disconnect and reconnect, etc. The estimated time, the estimated cost and benefits can be used to determine a possible utility for performing the fix and the determined utility is used to rank the options in order. This data may be accessed, e.g., at 116 shown in FIG. 1 for performing one or more auto-correct procedures.

The data tables described above illustrate examples of data that are employed to implement the methodology of the present disclosure in one embodiment. Some or all of the data described above may be stored locally on a user device; some or all of the data described above may be stored on a server remotely. Additional data or different data structure may be created and utilized. As such, the methodology of the present disclosure is not limited to employing those particular data and data structure.

Figure 3:
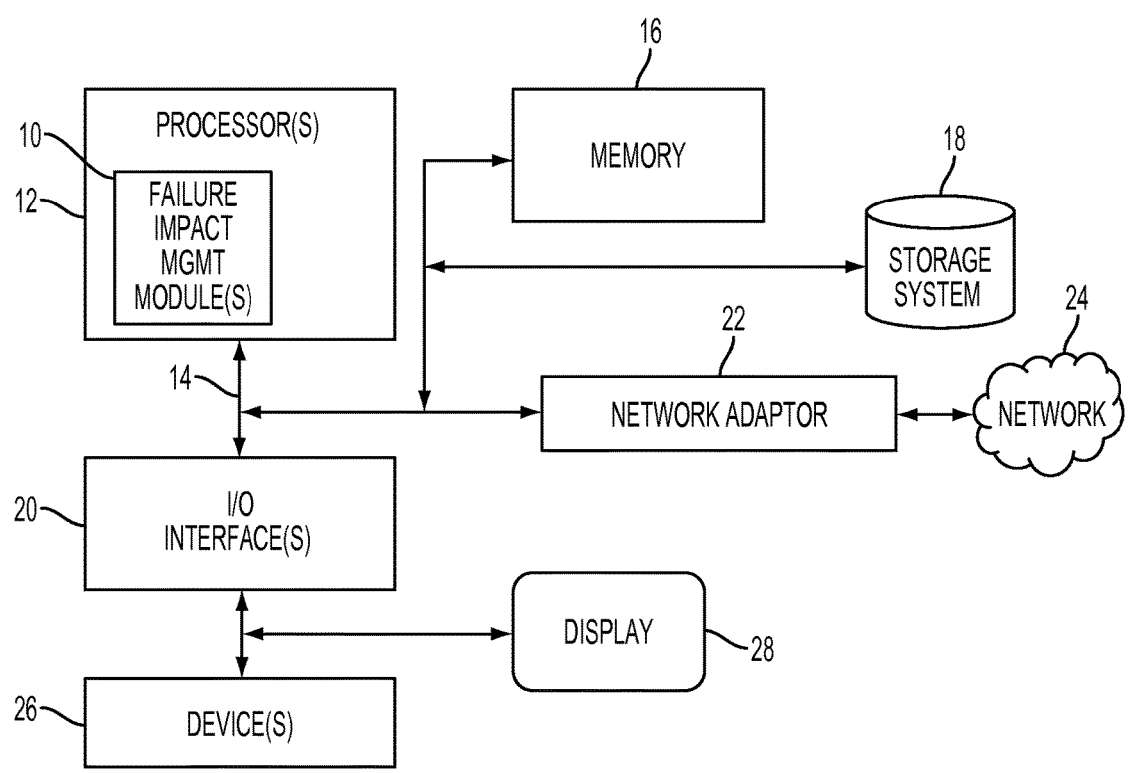
FIG. 3 illustrates a schematic of an example computer or processing system that may implement a failure impact management system in one embodiment of the present disclosure.

FIG. 3 illustrates a schematic of an example computer or processing system that may implement a failure impact (also referred to as a disaster manager) manager system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include one or more failure impact management modules 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of managing failure impact of a computing device, comprising:

generating an interrupt by a processor of a first device executing a monitoring software that detects a possible failure on the first device, wherein the processor is a secondary processor associated with the first device, the first device comprising a primary processor and the secondary processor, the secondary processor running a minimal operating system, wherein responsive to determining that the possible failure is associated with the primary processor, the primary processor branching a code to execute on the secondary processor;

responsive to the generated interrupt, determining by the processor whether a user of the first device has a scheduled function to be performed by the first device within a time range of the possible failure, by accessing calendar information associated with the user, the scheduled function involving the first device communicating with another device of another user;

determining by the processor a contact address for said another user by accessing the calendar information, responsive to determining that the first device is to perform the scheduled function within the time range of the possible failure;

transferring by the processor information to said another user via the contact address, responsive to determining that the first device is to perform the scheduled function within the time range of the possible failure; and the first device repairing itself automatically by resolving the possible failure by performing a self-diagnosis and auto-correct procedure, wherein the first device is a computer device.

2. The method of claim 1, wherein the transferring information comprises one or more of, sending information associated with the possible failure of the user's first device to the at said another user via the contact address; or transferring data stored on the first device and associated with the scheduled meeting to be held, to the at least one other participant via the contact address; or combinations thereof.

3. The method of claim 1, further comprising:
informing the user, of the possible failure of the user's first device.

4. The method of claim 1, wherein the transferring information to said another user comprises:
transmitting the contact address of said at least one other participant to a user's second device,
wherein a notification is sent to the contact address of said another user by the user's second device.

5. The method of claim 4, wherein the transmitting is performed via a wireless communication medium.

6. The method of claim 1, wherein the possible failure on the first device comprises one or more of:
a virus infecting the first device;
an intrusion on the first device;
a network failure; or
a system failure; or
combinations thereof.

7. The method of claim 1, further comprising:
determining a solution to the possible failure; and
notifying the user, of the solution.

8. The method of claim 1, further comprising:
subsequent to repairing the possible failure, notifying said another user by transmitting a message to the contact address of said another user that the user's first device is repaired.

9. The method of claim 8, wherein the transmitting the message to the contact address of said another user is performed by the user's second device.

10. The method of claim 8, wherein the transmitting the message to the contact address of said another user is performed by the user's first device.

11. A system for managing failure impact of a computing device, comprising:
a first device comprising at least one processor;
an impact failure manager module operable to execute on the processor and responsive to detecting a possible failure on the first device,
the impact failure manager further operable to determine whether a user of the first device has a scheduled function to be performed by the first device within a time range of the possible failure, by accessing calendar information associated with the user, the scheduled function involving the first device communicating with another device of another user,
the impact failure manager further operable to determine a contact address for said another user, responsive to determining that the first device is to perform the scheduled function within the time range of the possible failure,
the impact failure manager further operable to transfer information to said another user via the contact address, responsive to determining that the first device is to perform the scheduled function within the time range of the possible failure,
the first device operable to repair itself automatically by resolving the possible failure by performing a self-diagnosis and auto-correct procedure,
wherein the first device is a computer device,
wherein the processor is the first device's secondary processor running a minimal operating system, wherein the first device further comprises a primary processor, the primary processor branching code to execute on the secondary processor responsive to detecting that the possible failure is associated with the primary processor.

12. The system of claim 11, wherein the impact failure manager transfers information by one or more of:
sending information associated with the possible failure of the user's first device to said another user via the contact address; or
transferring data stored on the first device and associated with the scheduled function to be performed by the first device, to said another user via the contact address; or
combinations thereof.

13. The system of claim 11, wherein the impact failure manager transfers information to said another user by transmitting the contact address of said another user to a user's second device, wherein a notification is sent to the contact address of said another user by the user's second device.

14. A computer readable storage medium storing a program of instructions executable by a machine to perform a method of managing failure impact of a computing device, the method comprising:
generating an interrupt by a processor of a first device executing a monitoring software that detects a possible failure on the first device, wherein the processor is a secondary processor associated with the first device, the first device comprising a primary processor and the secondary processor, the secondary processor running a minimal operating system, wherein responsive to determining that the possible failure is associated with the primary processor, the primary processor branching a code to execute on the secondary processor;
determining whether a user of the first device has a scheduled function to be performed by the first device within a time range of the possible failure, by accessing calendar information associated with the user, the scheduled function involving the first device communicating with another device of another user;
determining a contact address for said another user by accessing the calendar information, responsive to determining that the first device is to perform the scheduled function within the time range of the possible failure;
transferring information to said another user via the contact address, responsive to determining that first device is to perform the scheduled function within the time range of the possible failure; and
the first device repairing itself automatically by resolving the possible failure by performing a self-diagnosis and auto-correct procedure,
wherein the first device is a computer device.

15. The computer readable storage medium of claim 14, wherein the transferring information comprises one or more of,
sending information associated with the possible failure of the user's first device to said another user via the contact address; or
transferring data stored on the first device and associated with the scheduled function to be performed by the first device, to said another user via the contact address; or
combinations thereof.

16. The computer readable storage medium of claim 14, further comprising:
informing the user, of the possible failure of the user's first device.

17. The computer readable storage medium of claim 14, wherein the transferring information to said another user comprises:
transmitting the contact address of said another user to a user's second device,
wherein a notification is sent to the contact address of said another user by the user's second device.

18. The computer readable storage medium of claim 17, wherein the transmitting is performed via a wireless communication medium.

19. The computer readable storage medium of claim 14, wherein the possible failure comprises one or more of:
- a virus infecting the first device;
- an intrusion on the first device;
- a network failure; or
- a system failure; or
- combinations thereof.

* * * * *